United States Patent [19]

Cady

[11] 4,444,249

[45] Apr. 24, 1984

[54] THREE-WAY HEAT PIPE

[75] Inventor: Edwin C. Cady, Orange, Calif.

[73] Assignee: McDonnell Douglas Corporation, Long Beach, Calif.

[21] Appl. No.: 294,566

[22] Filed: Aug. 20, 1981

[51] Int. Cl.³ .................. F28D 15/00; F25B 29/00
[52] U.S. Cl. ............................ 165/48 S; 165/45; 165/104.22; 165/104.25; 165/104.11; 62/260; 62/514 R; 62/119; 126/433; 126/436
[58] Field of Search ............... 126/433, 436; 62/260, 62/514, 119; 165/104.21, 104.22, 104.11, 104.25, 48 S, 45

[56] References Cited

U.S. PATENT DOCUMENTS

| | | | |
|---|---|---|---|
| 3,147,744 | 9/1964 | Percival | 165/104.11 X |
| 3,893,506 | 7/1975 | Laing | 165/104.11 X |
| 4,011,736 | 3/1977 | Harrison | 62/260 |
| 4,057,963 | 11/1977 | Basiulis | 126/433 X |
| 4,116,379 | 9/1978 | Movick | 165/104.22 X |
| 4,160,444 | 7/1979 | Hamilton | 126/433 X |
| 4,252,185 | 2/1981 | Kosson | 165/104.25 |
| 4,271,681 | 6/1981 | Schertz | 62/260 |
| 4,285,027 | 8/1981 | Mori et al. | 165/104.21 X |

Primary Examiner—Albert W. Davis, Jr.
Attorney, Agent, or Firm—Paul T. Loef; George W. Finch; Donald L. Royer

[57] ABSTRACT

A three-way heat pipe configured in a generally Y-shape having a condenser-evaporator or heat-sink end, an evaporator arm and a condenser arm. In addition to conventional internal pumping the heat pipe is mechanically pumped externally from the heat-sink end to the evaporator arm. Heat transfer can take place between any two of the three elements by thermostatically controlling the external pump. Heat or cold may be stored in a suitable medium surrounding the condenser-evaporator end of the pipe for later transfer through the condenser or evaporator ends used as heat exchangers without a secondary circulation system. Heat transfer may also take place directly between the evaporator and condenser arms without storage. In the preferred embodiment of the heat storage configuration, a valve is placed in the condenser arm to prevent unwanted heat transfer. A system of three-way heat pipes can provide long duration thermal storage of heat or cold energy which can be later used for space heating and/or cooling of buildings.

23 Claims, 4 Drawing Figures

THREE-WAY HEAT PIPE

BACKGROUND OF THE INVENTION

The present invention relates to heatpipes, and more particularly, relates to three-way heat pipes with a generally Y-configuration in which the leg functions as both a condenser and evaporator alternately, one arm functions as an evaporator and the third arm as a condenser. The invention relates further to a system employing three-way heat pipe for collecting, storing and utilizing thermal energy.

The increased cost of fossil fuels has directed much attention to various systems for collection and storage of thermal energy, both passive and active and combinations thereof. Typically, solar collectors have been used to collect heat energy which is then conveyed, usually by a flow loop or heat pipe, to a heat storage means for later use. Also, structural support assemblies for use in the Artic and Sub-Artic regions, which are characterized by a permafrost layer below the tundra, have been used to maintain the permafrost layer in the frozen condition so as to avoid freeze-thaw cycles and the associated heaving of the soil. These structures, sold under the trademark CRYO-ANCHOR, by the assignee of this patent, have been used extensively on the Alaskan pipeline and are nothing more than a heatpipe which conveys the cold in the air into the ground.

The ground is a very popular spot for storage of collected thermal energy as the Earth has an extremely large heat capacity as well as extremely low thermal conductivity. The latter is important since the storage is generally unbounded by insulation in at least two directions. However, in the case of the cold storage water or ice may be a more efficient storage means.

U.S. Pat. No. 4,138,995 to Yuan, teaches a pumped heatpipe for solar collection and storage along with a second pumped fluid loop for heat distribution. U.S. Pat. No. 4,240,268, to the same inventor, teaches a pumped heatpipe to freeze ice during the winter, plus a second pumped fluid loop for space cooling of buildings during the summer.

Both of these systems are complicated by the requirement for a separate pumped fluid loop to distribute the stored heat or cold which adds cost and increases the active elements subject to breakdown.

It is an important object of this invention to eliminate the second pumped fluid loop for heating or cooling distribution by use of a novel heat pipe arrangement.

It is a further object of this invention to isolate any portion of the heat transfer device from transferring unwanted heat while the conditioned space is demanding cold or vice versa.

SUMMARY OF THE INVENTION

In summary, the heat pipe of this invention accomplishes the above objects and overcomes the disadvantages of prior devices by providing a three-way heat pipe having a generally Y-configuration with a first leg which functions as either a condenser or evaporator and is identified as the heat-sink end. The leg divides into first and second arms one of which functions as an evaporator, and one of which functions as a condenser. The heat-sink end of the three-way heat pipe contains a suitable liquid and has provisions for pumping the liquid from the condenser-evaporator end to the evaporator arm. Heat may be applied, alternatively, to either the heat-sink end of the heat pipe or at the evaporator arm end of the heat pipe conduit depending on which two elements of the three-way heat pipe are to participate in the heat transfer. The latter, of course, is determined by whether the heat is being stored or transferred to the space to be conditioned and is controlled by turning the pump on or off. When the evaporator temperature drops below the ground temperature, the pump is turned off by thermostatic control.

The arms are geometrically arranged so that the evaporator arm makes an angle of less than 90° with the heat-sink portion of the heat pipe so as to retain the liquid and the condenser portion makes an angle greater than 90° with this conduit so that the condensate returns to the heat-sink end by gravity.

A valve may be installed in the three-way heat pipe used to store heat. The valve is located in the condenser arm to prevent heat transfer into the conditioned space during the time period heat is being stored. Valve opening is controlled by the temperature in the space to be conditioned. The same heat pipe is used to store heat energy, convey heat energy directly from the collector to the conditioned space or from the storage medium to the conditioned space.

BRIEF DESCRIPTION OF THE DRAWINGS

With reference to the drawings, wherein like reference numerals designate like portions of the invention.

DESCRIPTION OF THE PREFERRED EMBODIMENT

Figures 1, 2:
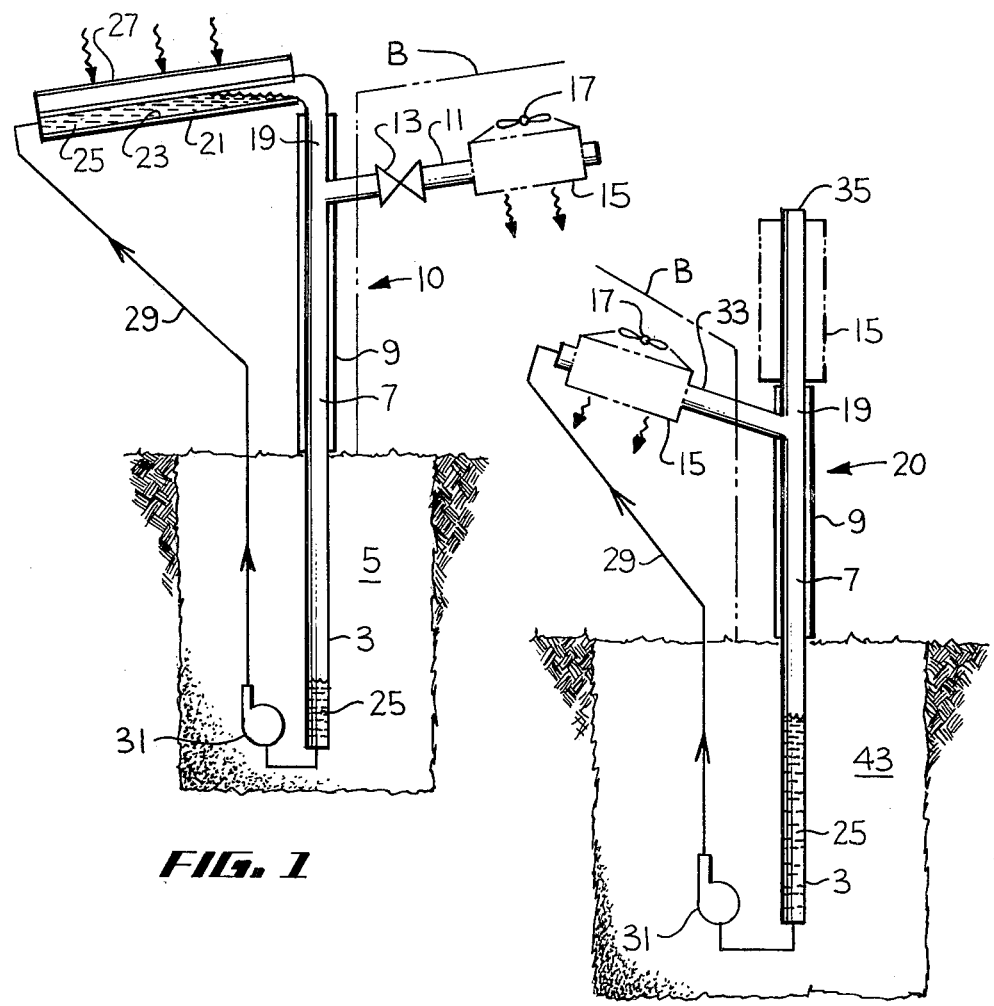
FIG. 1 is a three-way heat pipe, adapted for heat storage, shown somewhat in section and somewhat schematically.
FIG. 2 is a similar view of a three-way heat pipe adapted for cold storage.

FIG. 1 shows an embodiment of the three-way heat pipe configured for heat storage. The lower end or heat-sink portion, 3 of the conduit forming the three-way heat pipe 10 functions alternatively as either a condenser or evaporator and is shown buried in the earth or wet sand 5. The elongate conduit continues to form the adiabatic section 7 which is shown covered with insulation 9. Protruding from the adiabatic section 7 is the first arm of an overall Y-like shape identified as a condenser arm 11. Located in the condenser arm 11, near the adiabatic section, is a shut-off valve 13 which may be installed to avoid heat transfer when the space to be conditioned is in fact demanding cold air but heat is being transferred to the heat-sink end 3.

As shown, the reference lines indicates a building B, which represents the space to be conditioned. Condenser arm 11, of the three-way heat pipe 10, is shown penetrating into the building space to be conditioned. The end portion of the condenser arm 11 is shown to be equipped with fins shown by the reference lines 15. This condenser arm is built like a heat exchanger. Also shown, schematically, is a fan 17 which is used to blow air over the condenser fins to accelerate the condensation process and to transfer the heat of condensation to the air blown over the heat exchanger portion of the condenser arm 11. Condenser arm 11, as shown, makes an angle with the lower end or heat-sink portion, 3 of the three-way heat pipe which is greater than 90° so that the condensate will travel down the evaporator arm 11 to the adiabatic section 7 and eventually to the condenser evaporator end 3 by gravity.

After a short run portion 19, the second arm of the Y-like structure is formed at an angle slightly less than 90° to the heat-sink portion 3 and is identified as the evaporator arm 21. Inside the evaporator arm 21 is shown a wick 23 and a suitable working fluid 25. The working fluid 25 is also shown in the heat-sink end or leg portion 3. A typical solar collector 27 is shown attached to the evaporator arm 21. A second conduit 29 is shown connecting the heat-sink portion 3 to the evaporator arm 21 with a mechanical pump 31 installed in the conduit 29.

In function, during the summer, the solar collector 27 collects heat with which it vaporizes the working fluid 25 in the evaporator arm 21. Working fluid vapor is thermally pumped from the evaporator arm 21 through the adiabatic section 7 into the condenser-evaporator or heat-sink end 3 where it condenses back to a liquid state and is pumped by the mechanical pump 31 back to the evaporator arm 21. Since the working fluid vapor condenses in the heat-sink end 3 of the heat pipe, which is buried in the earth 5, it releases its heat to the surrounding earth for storage. The valve 13 in the condenser arm 11 is closed to prevent the working fluid vapor from condensing in the condenser arm 11 and thereby releasing unwanted heat in the space to be conditioned inside the building B. While the valve 13 is not absolutely essential, it is desirable. A wick 23 in the evaporator arm carries the working fluid up the small slope of the evaporator arm 21 and the cycle is repeated.

During cold weather, as in the fall, winter and early spring, when the solar collector 27 is cooler than the earth 5, the pump 31 is shut off by a thermostatic control (not shown). Now the working fluid 25 vaporizes in the heat-sink leg 3 of the heat pipe 10 as the earth 5 surroundig this end of the pipe is warm. The vapor is admitted through the control valve 13, also thermostatically controlled, into the condenser arm 11 where it condenses and releases heat to the space to be conditioned in the building B. The heat transfer process is enhanced by the fan 17 which blows over the fins 15. Since the evaporator arm 21 is now colder then the residence or building B, some of the working fluid 25 will condense in this portion of the heat pipe, flooding it and remaining there since it cannot drain back to the heat-sink leg 3. Condensation must now take place in the condenser arm 11 and the cycle continues since sufficient working fluid is to be provided to fill the evaporator arm 21 and provide sufficient additional working fluid for the cycle to continue between the heat-sink leg 3 and the condenser arm 11.

Should a warm day occur so that the solar collector warms up to a temperature above that of the space to be codditioned in the building B, the working fluid 25 trapped in the evaporator arm 21 will evaporate and transport heat directly to the condenser arm 11 until the evaporator arm 21 boils dry. Should temperature of the evaporator arm 21, attached to the solar collector 27, rise above the earth temperature 5, the pump 31 is thermostatically controlled to start and transport working fluid to the evaporator arm 21. Now the heat is transferred directly to building B as the valve 13 admits the vapor to the condenser arm 11. Alternatively, if the valve 13 is closed, as controlled by the thermostat, heat will be transported to the earth 5 as previously indicated. When the valve 13 is open, condensation takes place in the condenser arm 11 and the condensate returns by gravity to the condenser-evaporator end 3 and the cycle is reiterated.

It should now be reasonably clear that heat may be: (a) either transferred from the evaporator arm 21 to the heat-sink leg 3 where it is stored in the earth 5 or (b) direct transfer by evaporation from the heat-sink end 3 to the condenser arm 11 through the valve 13, or (c) alternately, heat may be transferred directly from the evaporator arm 21 to the condenser arm 11 through the valve 13, depending on relative temperatures.

An alternative embodiment of the three-way heat pipe is shown in FIG. 2, which is adapted for cold storage and to function as a cooling heat pipe. The lower end of the cooling heat pipe 20 is styled similar to that of the heating heat pipe 10 in that the heat-sink portion 3 is followed by the adiabatic section 7 shown insulated at 9. The medium surrounding the heat-sink end 3 functions as a sink or cold storage medium and may be wet sand, earth, or water. Water, which freezes, is considered a better storage medium and is shown at 43. As might be expected, since we are transferring cold, cooling pipe evaporator 33 is shown penetrating the building B. The evaporator is fashioned as a heat exchanger, as in the case of the condenser 11 in the heating pipe 10, with fins 15 and a fan 17 that accelerates the exchange of heat. Cooling pipe evaporator arm 33 is shown at an angle slightly obtuse to the leg portion 3. This arrangement is desirable to avoid a valve in the cooling pipe evaporator arm 33 to prevent accumulation of condensate in the evaporator arm 33 when the intended transfer is between the cooling pipe condenser arm 35 and the heat-sink portion 3. The cooling pipe condenser arm 35 is shown on the run with the lower end or heat-sink portion 3 and is also equipped with fins 15 for better heat transfer to the air. Again, this geometry could be modified. The vertical run is the most direct connection to the heat-sink end 3. The end of the condenser-evaporator or heat-sink portion 3 of the heat pipe is connected to the end of the cooling pipe evaporator arm 33 by the conduit 29 which includes a mechanical pump 31 to pump the condensate back to the evaporator.

The cooling three-way heat pipe 20 operates to freeze ice in the ground during the cold winter months and uses this ice to cool the space to be conditioned in the building during the warmer summer months. During the winter. the heat pipe functions to extract heat from the water 43 by the heat of vaporization as a result of evaporating the working fluid 25 in the heat-sink portion 3 and rejects the heat by condensing the working fluid vapor at the condenser end 35 as a result of the colder winter air surrounding this end of the pipe. The cycle is repeated until the water 43 freezes. During this phase of the operation, the cooling pipe evaporator arm 33, enclosed in the space to be conditioned in the building B, is inoperative and the pump 31 is shut off so that the working fluid 25 cannot reach the evaporator portion 33. The working fluid condenses in the cooling pipe condenser arm 35 which is located in the outside air and returns by gravity to the immersed section or heat-sink portion 3 of the cooling three-way heat pipe 20. During spring, summer and fall, when the outside air temperature is warmer than 0° C., the cooling heat-pipe 20 is inoperative. However, when the outside air temperature is warmer than the temperature of the space to be conditioned, and the latter demands cooling, the pump 31 is thermostatically acutated and the working fluid 25 evaporates in the cooling pipe evaporator arm 33, cooling the air blown over it by the fan 17, and the vapor is condensed in the immersed section of the heat pipe identified as the condenser-evaporator or heat-sink portion 3 of the cooling three-way heat pipe 20. The cycle is repeated until the ice 43 has melted and the water heated above the temperature of the air and the space to be conditioned. At this point, the pump 31 is again thermostatically turned off and the working fluid 25 is no longer pumped from the condenser-evaporator portion 3 to the cooling pipe evaporator arm 33, terminating the cycle.

Figure 3:
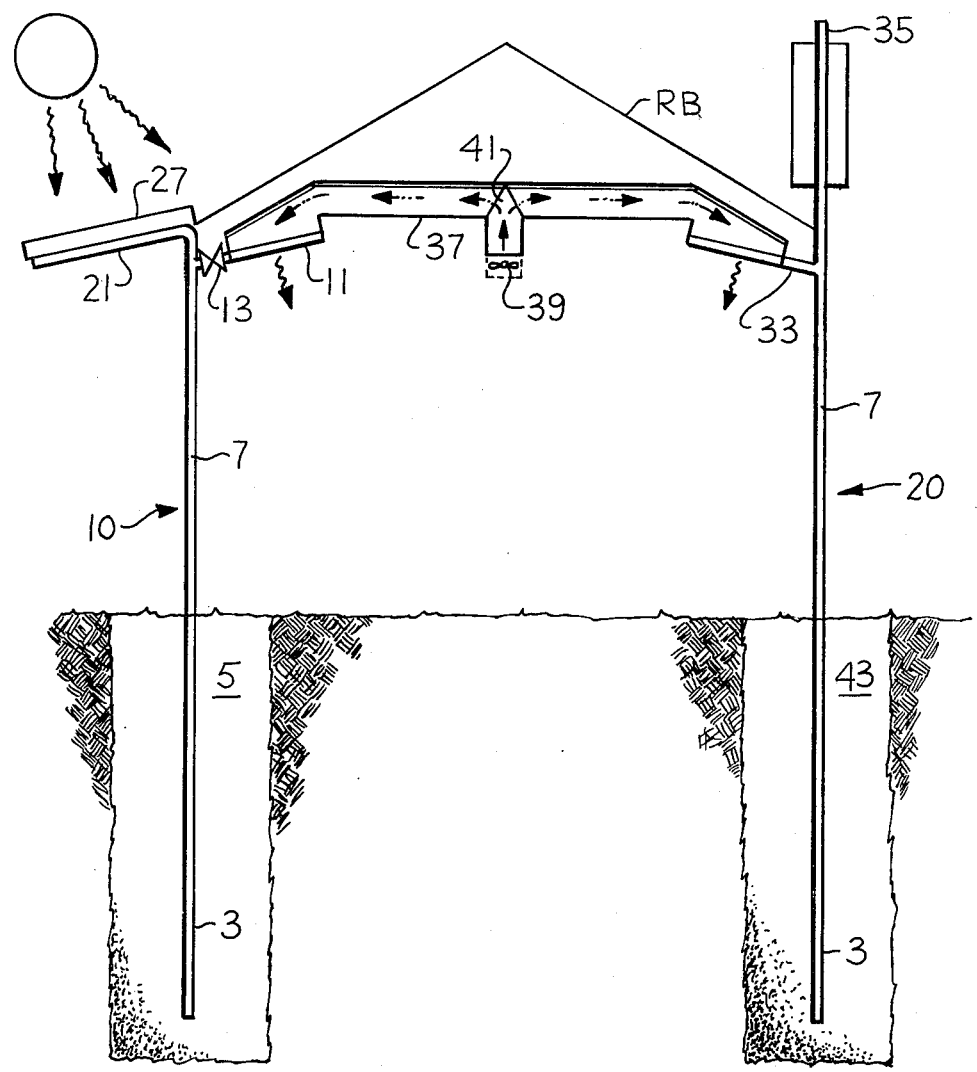
FIG. 3 is a somewhat schematic view of the two three-way heat pipes, one for heat storage and one for cold storage, shown in a typical structure to be conditioned using a common air circulation system.

A typical installation in a residential type building RB is shown in FIG. 3. A series of heating three-way heat pipes 10 are arranged on the southern end of the structure and a series of cooling three-way heat pipe 20 arranged on the northern exposure of the structure. In this arrangement the solar collectors 27 and the heated ground storage 5 are exposed to the sun while the cooling heat pipe 20 along with the ice storage 33 are shaded and exposed to the north wind. A common air duct system is shown at 37, driven by a common blower 39, and is provided with a movable diverter plate 41 for control of the hot and cold air flows. In summer, when the temperature of the evaporator arms 21 or 33 fall below the temperature of the respective heat/cold storage 5 or 43, the pumps always shut off as no evaporation can take place. In the case of the cooling three-way heat pipe 20, the pump is further controlled by the demands of the space to be conditioned. In the heating three-way heat pipe 10, the valve 13 is controlled by the demand of the space to be conditioned. In any case, thermostatic controls, well-known to those skilled in the art can be used to control the three-way heat pipes.

Figure 4:
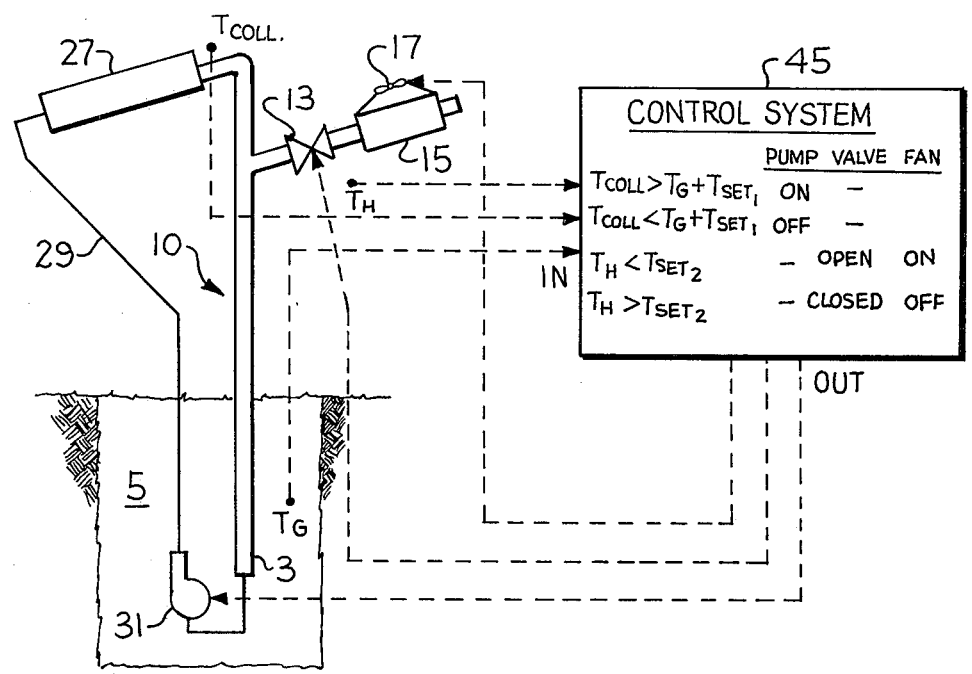
FIG. 4 is a schematic of a typical control system for the external pump and the valve in the condenser arm of a three-way heat pipe.

A simple control system is shown in FIG. 4 for a three-way heat pipe adapted for heat storage. A temperature sensor, $T_{COLL.}$, is attached to the collector 27 and a second temperature sensor is buried in the earth 5 surrounding the heat-sink end 3 of the heat pipe 10. A third temperature sensor $T_H$ is located in the building or house to be conditioned. The three temperature sensor outputs are fed to a controller 45. If the collector 27 temperature is greater than the temperature of the ground 5 by a pre-determined amount, identified as $T_{SET\ 1}$, the pump 31 is turned on, conversely, if the temperature of the collector 27 falls below the temperature of the ground 5, plus the pre-determined amount $T_{SET\ 1}$, the pump 31 is turned off. Further, if the temperature of the space to be conditioned $T_H$ is less than a pre-determined control point, identified as $T_{SET\ 2}$, the valve 13 is opened and the fan 17 energized. Alternatively, if the temperature $T_4$ falls below the control point the pump 31 and fan 17 are shut off. Many alternative control schemes are available. It may thus be seen that the three-way heat pipe arrangements, depicted in the several embodiments of this invention, serve to solve the indicated problems and eliminate some of the active elements in the prior art to produce an almost totally passive heating-cooling system.

This invention is not limited to the embodiments disclosed above, but all changes and modifications thereof not constituting deviations from the spirit and scope of this invention are intended to be included.

What is claimed is:

1. A closed ended heat pipe system for the transfer of thermal energy by heat of vaporization and condensation, said system comprising:
   a first heat pipe including:
      a first condenser arm;
      a first evaporator arm;
      a first heat storage arm connected to said first condenser and first evaporator arms and positioned with respect to gravity below said first condenser and first evaporator arms;
      a first heat storage means contacting said first heat storage arm;
      a working fluid in said first heat pipe for the transfer of thermal energy by heat of vaporization and condensation between said first condenser, first heat sink, and first evaporator arms; and
      first means to pump said working fluid in liquid form from said first heat sink arm to said first evaporator arm.

2. The closed ended heat pipe system for the transfer of thermal energy by heat of vaporization and condensation as defined in claim 1 wherein said first heat pipe further includes:
   a first adiabatic portion between said first heat storage arm and said first condenser and first evaporator arms.

3. The closed ended heat pipe system for the transfer of thermal energy by heat of vaporization and condensation as defined in claim 2 wherein said first evaporator arm slopes downwardly for connection to said first adiabatic portion whereby any liquid working fluid in said first evaporator arm tends to flow under the force of gravity into said first adiabatic portion.

4. The closed ended heat pipe system for the transfer of thermal energy by heat of vaporization and condensation as defined in claim 3 wherein said first evaporator arm includes:
   controllable means to transfer thermal energy at said first evaporator arm.

5. The closed ended heat pipe system for the transfer of thermal energy by heat of vaporization and condensation as defined in claim 4 further including:
   a second heat pipe including:
      a second condenser arm, said second condenser arm being connected to said controllable means to transfer thermal energy at said first evaporator arm so that said controllable means can transfer thermal energy at said second condenser arm also;
      a second evaporator arm;
      a second heat storage arm connected to said second condenser and second evaporator arms and positioned with respect to gravity below said second condenser and second evaporator arms;
      a second heat storage means contacting said second heat storage arm;
      a working fluid in said second heat pipe for the transfer of thermal energy by heat of vaporization and condensation between said second condenser, second heat storage, and second evaporator arms; and
      second means to pump said working fluid in liquid form from said second heat storage arm to said second evaporator arm.

6. The closed ended heat pipe system for the transfer of thermal energy by heat of vaporization and condensation as defined in claim 5 wherein said second heat pipe further includes:

a second adiabatic portion between said second heat storage arm and said second condenser and second evaporator arms.

7. The closed ended heat pipe system for the transfer of thermal energy by heat of vaporization and condensation as defined in claim 6 wherein said second evaporator arm slopes upwardly for connection to said second adiabatic portion whereby any liquid working fluid in said second evaporator arm under the force of gravity tends to remain in said second eveaporator arm.

8. The closed ended heat pipe system for the transfer of thermal energy by heat of vaporization and condensation as defined in claim 7 wherein said second condenser arm slopes downwardly for connection to said second adiabatic portion whereby any liquid working fluid in said second condenser arm tends to flow under the force of gravity into said second adiabatic portion.

9. The closed ended heat pipe system for the transfer of thermal energy by heat of vaporization and condensation as defined in claim 8 wherein said second condenser arm includes:
a valve positioned between said second condenser arm and said second adiabatic portion for controlling communication between said second condenser arm and said second adiabatic portion.

10. The closed ended heat pipe system for the transfer of thermal energy by heat of vaporization and condensation as defined in claim 9 wherein said second evaporator arm includes:
a wick (23) positioned therein whereby liquid working fluid in said second evaporator arm tends to be carried up said second evaporator thereby.

11. The closed ended heat pipe system for the transfer of thermal energy by heat of vaporization and condensation as defined in claim 1 wherein said first means to pump said working fluid in liquid form from said first heat storage arm to said first evaporator arm include:
first control means to actuate said first means and thereby cause said first means to pump said working fluid in liquid form from said first heat storage arm to said first evaporator arm when the temperature of said first evaporator arm is higher than the temperature of said first heat storage arm.

12. The closed ended heat pipe system for the transfer of thermal energy by heat of vaporization and condensation as defined in claim 10 wherein said first means to pump said working fluid in liquid form from said first heat sink arm to said first evaporator arm include:
first control means to actuate said first means and thereby cause said first means to pump said working fluid in liquid form from said first heat sink arm to said first evaporator arm when the temperature of said first evaporator arm is higher than the temperature of said first heat sink arm.

13. The closed ended heat pipe system for the transfer of thermal energy by heat of vaporization and condensation as defined in claim 12 wherein said second means to pump said working fluid in liquid form from said second heat sink arm to said second evaporator arm include:
second control means to actuate said second means and thereby cause said second means to pump said working fluid in liquid form from said second heat storage arm to said second evaporator arm when the temperature of said second evaporator arm is higher than the temperature of said second heat storage arm.

14. The closed ended heat pipe system for the transfer of thermal energy by heat of vaporization and condensation as defined in claim 2 wherein said first evaporator arm slopes upwardly for connection to said first adiabatic portion whereby any liquid working fluid in said first evaporator arm tends to remain.

15. The closed ended heat pipe system for the transfer of thermal energy by heat of vaporization and condensation as defined in claim 14 wherein said first condenser arm slopes downwardly for connection to said first adiabatic portion whereby any liquid working fluid in said first condenser arm tends to flow under the force of gravity into said first adiabatic portion.

16. The closed ended heat pipe system for the transfer of thermal energy by heat of vaporization and condensation as defined in claim 15 wherein said first condenser arm includes:
a valve positioned between said first condenser arm and said first adiabatic portion for controlling communication between said first condenser arm and said first adiabatic portion.

17. The closed ended heat pipe system for the transfer of thermal energy by heat of vaporization and condensation as defined in claim 16 wherein said first evaporator arm includes:
a wick (23) positioned therein whereby liquid working fluid in said first evaporator arm tends to be carried up said first evaporator thereby.

18. The closed ended heat pipe system for the transfer of thermal energy by heat of vaporization and condensation as defined in claim 16 wherein said first means to pump said working fluid in liquid form from said first heat storage arm to said first evaporator arm include:
first control means to actuate said first means and thereby cause said first means to pump said working fluid in liquid form from said first heat storage arm to said first evaporator arm when the temperature of said first evaporator arm is higher than the temperature of said first heat storage arm.

19. The closed ended heat pipe system for the transfer of thermal energy by heat of vaporization and condensation as recited in claim 10 further comprising:
a solar heat collector attached to said second evaporator arm.

20. The closed ended heat pipe system for the transfer of thermal energy by heat of vaporization and condensation as recited in claim 10 wherein said second heat storage arm is positioned in wet sand so as to provide thermal storage.

21. The closed ended heat pipe system for the transfer of thermal energy by heat of vaporization and condensation as recited in claim 3 wherein said first heat storage arm is positioned in contained water so as to provide cold storage in the form of ice.

22. The closed ended heat pipe system for the transfer of thermal energy by heat of vaporization and condensation as recited in claim 3 wherein said first condenser arm is formed on the run with said first heat storage arm so as to form an angle of approximately 180° between said first condenser arm and said first heat storage arm.

23. The closed ended heat pipe system for the transfer of thermal energy by heat of vaporization and condensation as recited in claim 9 in combination with a building space to be thermally conditioned wherein said first evaporator arm and said second condenser arm are located inside said building and blower means are included in said controllable means to selectively blow over said first evaporator arm or said second condenser arm and said first and second heat storage arms are located outside of said building.

* * * * *